(12) United States Patent
Golan

(10) Patent No.: US 8,681,343 B2
(45) Date of Patent: Mar. 25, 2014

(54) THREE DIMENSIONAL INSPECTION AND METROLOGY BASED ON SHORT PULSES OF LIGHT

(75) Inventor: Gilad Golan, Raanana (IL)

(73) Assignee: Camtek Ltd., Migdal Haemek (IL)

( * ) Notice: Subject to any disclaimer, the term of this patent is extended or adjusted under 35 U.S.C. 154(b) by 82 days.

(21) Appl. No.: 13/282,502

(22) Filed: Oct. 27, 2011

(65) Prior Publication Data

US 2012/0105869 A1    May 3, 2012

Related U.S. Application Data

(60) Provisional application No. 61/408,611, filed on Oct. 31, 2010.

(51) Int. Cl.
*G01B 11/24* (2006.01)

(52) U.S. Cl.
USPC .......................................... 356/601; 356/610

(58) Field of Classification Search
USPC .................................................. 356/601–623
See application file for complete search history.

(56) References Cited

U.S. PATENT DOCUMENTS

| | | | | |
|---|---|---|---|---|
| 3,856,986 A | * | 12/1974 | Macovski | 348/40 |
| 5,305,759 A | * | 4/1994 | Kaneko et al. | 600/476 |
| 5,978,095 A | * | 11/1999 | Tanaami | 356/445 |
| 6,512,385 B1 | * | 1/2003 | Pfaff et al. | 324/754.23 |
| 6,525,828 B1 | * | 2/2003 | Grosskopf | 356/613 |
| 7,474,393 B2 | * | 1/2009 | Wojciechowski | 356/213 |
| 2003/0148393 A1 | * | 8/2003 | Woodbury et al. | 435/7.2 |

* cited by examiner

*Primary Examiner* — Hoa Pham
(74) *Attorney, Agent, or Firm* — Oren Reches

(57) ABSTRACT

A system and a method may be provided. The system may include an illumination module arranged to illuminate an object by short pulses of light that form at least one spot on the object; a collection module that comprises a sensor that is arranged to generate detection signals representative of three dimensional information about the object: and a mechanical stage that is arranged to introduce a movement between the object and at least one of the collection module and the illumination module.

18 Claims, 9 Drawing Sheets

THREE DIMENSIONAL INSPECTION AND METROLOGY BASED ON SHORT PULSES OF LIGHT

RELATED APPLICATIONS

This application claims the benefit of U.S. provisional patent Ser. No. 61/408,611, filing date Oct. 31, 2010 which is incorporated herein by reference.

BACKGROUND OF THE INVENTION

Three dimensional (3D) imaging may require continues line imaging, point scan imaging or area step-and-scan in order to get image for 3D imaging and/or metrology.

Examples for implementations may include:
i. Point scanning—this may include Confocal Chromatic Scanning, which is very slow.
ii. Line scanning includes using a triangulation system which is also slow.
iii. Confocal imaging includes step-and-scan and in each position a Z motion movement is requires and is very slow.
iv. Stereoscopy—using step-and-scan—in each position requires taking at least 2 images from viewing angles—is very slow.
v. Interferometry—different method using one or more lasers or white light sources.

SUMMARY

Various systems and method for strobe based three dimensional imaging may be provided. The imaging can be used for inspection, metrology, process monitoring and the like.

According to an embodiment of the invention a system for strobe based three dimensional imaging is provided, the system may include an illumination module arranged to illuminate an object by short pulses of light that form at least one spot on the object; a collection module that comprises a sensor that is arranged to generate detection signals representative of three dimensional information about the object: and a mechanical stage that is arranged to introduce a movement between the object and at least one of the collection module and the illumination module. The duration of the short pulses may be a fraction of a second, few milliseconds, few hundred milliseconds, few tenths of milliseconds, few microns, few tens of a micron, few hundred of micron, few seconds and the like. Few can include, for example, 1 to 6. The duration is short in the sense that it freezes the image—the movement of the object does not cause significant blurs in the acquired image.

The illumination module may be arranged to illuminate an object by an array of spots; and wherein the collection module comprises multiple pinholes that may be arranged to provide light from illuminated points of the object that are located at different focal planes and a sensor arranged to detect the light from the multiple pinholes.

According to an embodiment of the invention a system for strobe based three dimensional imaging is provided. The system may include (a) an illumination module arranged to illuminate an object by an array of spots; (b) a collection module that may include: multiple pinholes that are arranged to provide light from illuminated points of the object that are located at different focal planes; a sensor arranged to detect the light from the multiple pinholes; and (c) a mechanical stage that may be arranged to introduce a movement between the object and at least one of the collection module and the illumination module.

According to an embodiment of the invention a method for strobe based three dimensional imaging can be provided, the method may include: illuminating an object by short pulses of light that form at least one spot on the object; generating, by a sensor, detection signals representative of three dimensional information about the object; and introducing movement between the object and at least one of the collection module and the illumination module.

According to an embodiment of the invention a method for strobe based three dimensional imaging can be provided, the method may include: illuminating, by an illumination module, an object by an array of spots; providing, by multiple pinholes of a collection module, light from illuminated points of the object that are located at different focal planes; detecting, by a sensor, light from the illuminated points; and introducing a movement between the object and at least one of the collection module and the illumination module.

The multiple pinholes may be arranged in groups of pinholes, and at least two groups of pinholes differ from each other by a focal plane from which each group of pinhole provides light.

The multiple pinholes may be arranged in groups of pinholes, pinholes that belong to a same group of pinholes provide light from a same focal plane; and different groups of pinholes provide light from different focal planes.

The multiple pinholes may form a staggered array of pinholes.

The illumination module may include an illumination module array of pinholes and a light source arranged to direct collimated light through the array of pinholes to provide an array of spots that impinge onto the object.

The system may include a beam splitter positioned between the object, the illumination module array of pinholes and the multiple pinholes.

The multiple pinholes may be arranged in groups of pinholes; different groups of pinholes are located at different distances from the sensor.

The multiple pinholes may be arranged in groups of pinholes; different groups of pinholes are located at different distances from the object.

The illumination module may include a pulsating light source.

The method may include directing, by a beam splitter, light from the illumination module array of pinholes towards the object; and directing, by the beam splitter, light from the illuminated spots of the object towards the multiple pinholes.

The method may include illuminating the object in a pulsating manner.

According to an embodiment of the invention a system may be provided and may include an illumination module and a collection module. The illumination module may include a pulsed illumination source; wherein the illumination module and the collection module share a first beam splitter; wherein the collection module further comprises a first sensor; wherein the pulsed illumination source may be arranged to direct pulses of light towards the first beam splitter; wherein the first beam splitter may be arranged to direct the pulses of light towards the object at an angle of illumination that differs from ninety degrees; wherein the first beam splitter may be arranged to direct light reflected from the object towards the first sensor.

The illumination module and the collection module may also share a second beam splitter; wherein the collection module further comprises a second sensor; wherein the pulsed illumination source is arranged to direct pulses of light towards the first beam splitter and the second beam splitter; wherein each of the first and second beam splitters is arranged to direct the pulses of light towards the object concurrently and over different angles of illumination; wherein each angle of illumination differs from ninety degrees; wherein the first beam splitter is arranged to direct light reflected from the object towards the first sensor; and wherein the second beam splitter is arranged to direct light reflected from the object towards the second sensor.

According to an embodiment of the invention a system may be provided wherein the illumination module may include a pulsed illumination source; wherein the illumination module and the collection module share a first beam splitter; wherein the collection module may further include a first sensor; wherein the pulsed illumination source may be arranged to direct pulses of light towards the first beam splitter; wherein the first beam splitter may be arranged to direct the pulses of light towards the object at an angle of illumination that differs from ninety degrees; wherein the first beam splitter is arranged to direct light reflected from the object towards the first sensor.

The illumination module and the collection module may also share a second beam splitter; wherein the collection module further comprises a second sensor; wherein the pulsed illumination source is arranged to direct pulses of light towards the first beam splitter and the second beam splitter; wherein each of the first and second beam splitters is arranged to direct the pulses of light towards the object concurrently and over different angles of illumination; wherein each angle of illumination differs from ninety degrees; wherein the first beam splitter is arranged to direct light reflected from the object towards the first sensor; and wherein the second beam splitter is arranged to direct light reflected from the object towards the second sensor.

According to an embodiment of the invention a system may be provided and may include: a pulsed illumination source; a first beam splitter; a second beam splitter; a first sensor a second sensor; a mechanical stage for supporting an object and for moving the object in relation to the pulsed illumination source. The pulsed illumination source may be arranged to direct pulses of light towards the first beam splitter and the second beam splitter. Each of the first and second beam splitters may be arranged to direct the pulses of light towards the object concurrently and over different angles of illumination. Each angle of illumination differs from ninety degrees. The first beam splitter may be arranged to direct light reflected from the object towards a first sensor. The second beam splitter may be arranged to direct light reflected from the object towards a second sensor.

According to an embodiment of the invention a method may be provided and may include: supporting, by a mechanical stage object and moving the object in relation to a pulsed illumination source; directing, by the pulsed illumination source, pulses of light towards a first beam splitter and a second beam splitter; directing, by each of the first and second beam splitters, the pulses of light towards the object concurrently and over different angles of illumination; each angle of illumination differs from ninety degrees; directing, by the first beam splitter, light reflected from the object towards a first sensor; directing, by the second beam splitter, light reflected from the object towards a second sensor; and generating detection signals by the first and second sensors.

The first and second beam splitters are positioned in a symmetrical manner along an imaginary axis between the pulsed illumination source and the object; the first and second sensors are positioned in a symmetrical manner along the imaginary axis.

A length of (a) a first path defined by the pulsed illumination source, the first beam splitter, the object and the first sensor equals a length of (b) a second path defined by the pulsed illumination source, the second beam splitter, the object and the second sensor.

The first and second beam splitters illuminate the object at illumination angles of and degrees.

The method may include illuminating the object, by the first and second beam splitters, at illumination angles of and degrees.

According to an embodiment of the invention a system may be provided and may include a light source; a beam splitter; a sensor; a mechanical stage; the light source may be arranged to direct a beam of light towards a beam splitter; the beam splitter may be arranged to: split the beam of light to a first beamlet that is directed towards the sensor and to a second beamlet that is directed toward the object; and direct light reflected from the object towards the sensor.

The mechanical stage may move the object along three imaginary axes that are normal to each other. These can include the x-axis, y-axis and z-axis.

According to an embodiment of the invention a method may provided and may include: directing, by a light source, a beam of light towards a beam splitter; splitting, by the beam splitter, the beam of light to a first beamlet and to a second beamlet; directing the first beamlet towards a sensor; directing the second beamlet toward the object; directing, by the beam splitter, light reflected from the object towards the sensor; and generating detection signals by the sensor.

The method may include moving the object along three imaginary axes that are normal to each other, and thereby scanning the object.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
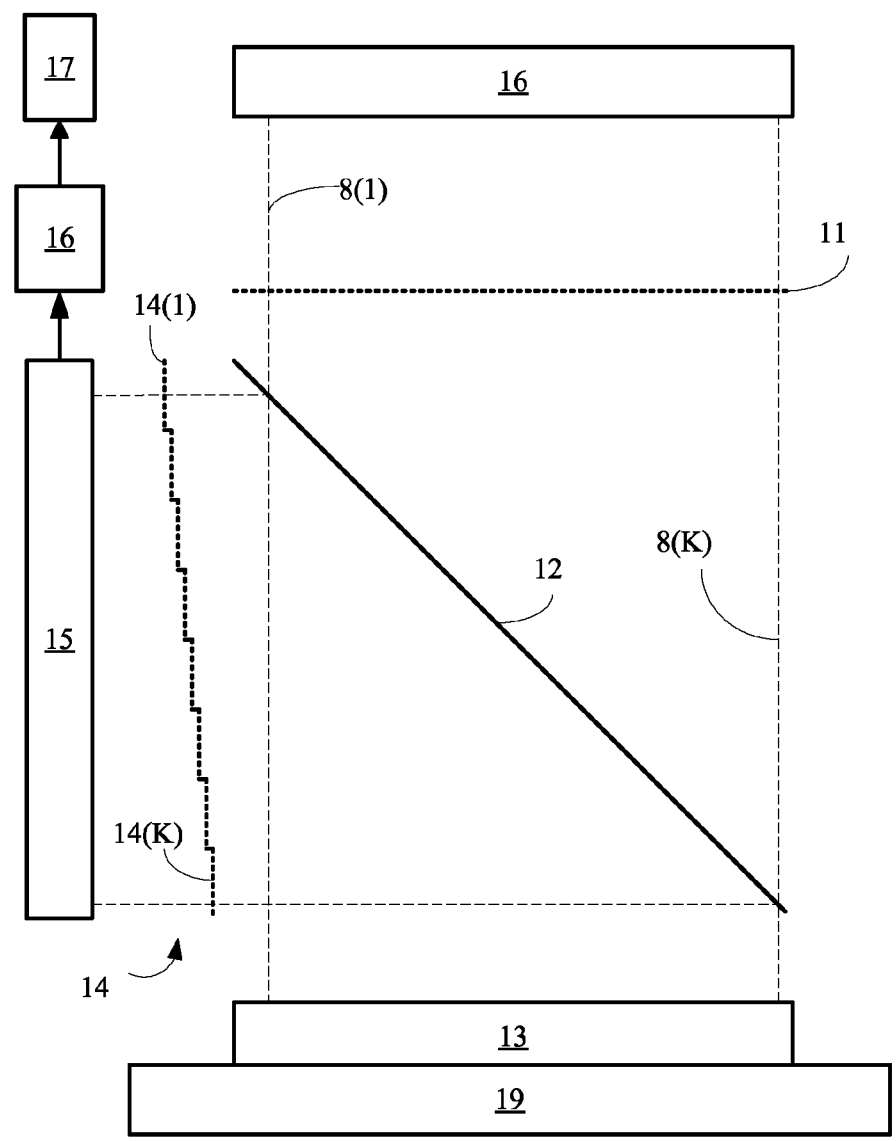
FIGS. 1A-1B illustrate a system and portions of the system according to various embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Various systems and method are illustrated below. Any combination of these systems and elements of these systems can be provided. Any combination of methods and stages of each method can be provided. The detection signals collected by any of these systems or methods can be processed in one or more manners to obtain information about the object, the object manufacturing process and any other process. For simplicity of explanation various elements of method and systems were not shown in one or more of the following images and these elements may include, for example, image processors, storage units, communication modules, and the like.

The following text refers to a pulsed light source. Those of skill in the art will appreciate that an equivalent to a pulsed light source is a continuous light source and one or more shutter that opens for short periods for allowing pulses of light to be directed towards the object and, additionally or alternatively to reach the detector. Both equivalents are covers by the claims.

A three dimensional (3D) imaging system may include an Automatic Optical Inspection (AOI) platform (including a mechanical stage or other motion system), a stroboscopic illumination and an analyzer for analyzing detection signals and generating 3D-information that corresponds to the 3D structure of the inspected article.

AN EMBODIMENT

FIG. 1A illustrates a system 10 according to an embodiment of the invention.

System 10 includes pulsed light source 16 for generating a collimated light beam that passes through a second array of pinholes 11 (and through beam splitter 12) to form spots on article 13. The pulse light source 14, the second array of pinholes 11 and the beam splitter may form an illumination module.

FIG. 1A also illustrates the second array of pinholes 11 as being flat and includes K rows 11(1)-11(K). K being a positive integer.

Light from the article 13 passes through the beam splitter 12 and through first array of pinholes 14 towards sensor 15.

The beam splitter 12, the first array of pinholes 14 and the sensor 15 may form a collection module.

Sensor 15 provides sensing signals to frame grabber 16 that sends pixels (or other detection signals) to image processor 17 or other analyzer for generating 3D information. A movement is introduced between the object 13 and components 11, 12 and 14. The movement can be introduced by mechanical stage 19 that is shown as supporting the article 13.

In confocal microscopy an article is illuminated by a narrow spot (also referred to as point) and the light from the article passes through a narrow pinhole (also referred to as pinhole) that is located at an optically conjugate plane in front of a detector. Only light (from the object) that is very close to a focal plane defined by the pinhole is detected by the detector.

The first array of pinholes 14 includes multiple pinholes that are located at different heights and can provide information from points located at different focal planes.

Figure 1A:
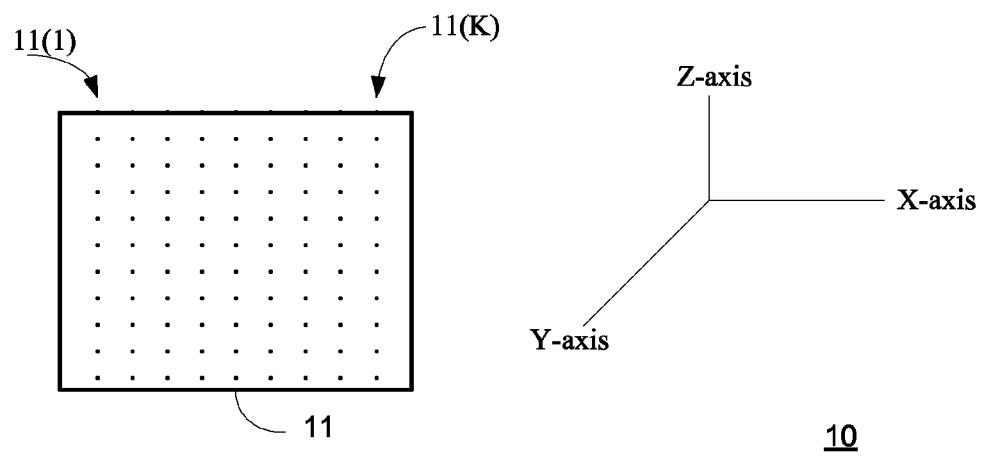
Figure 1B:
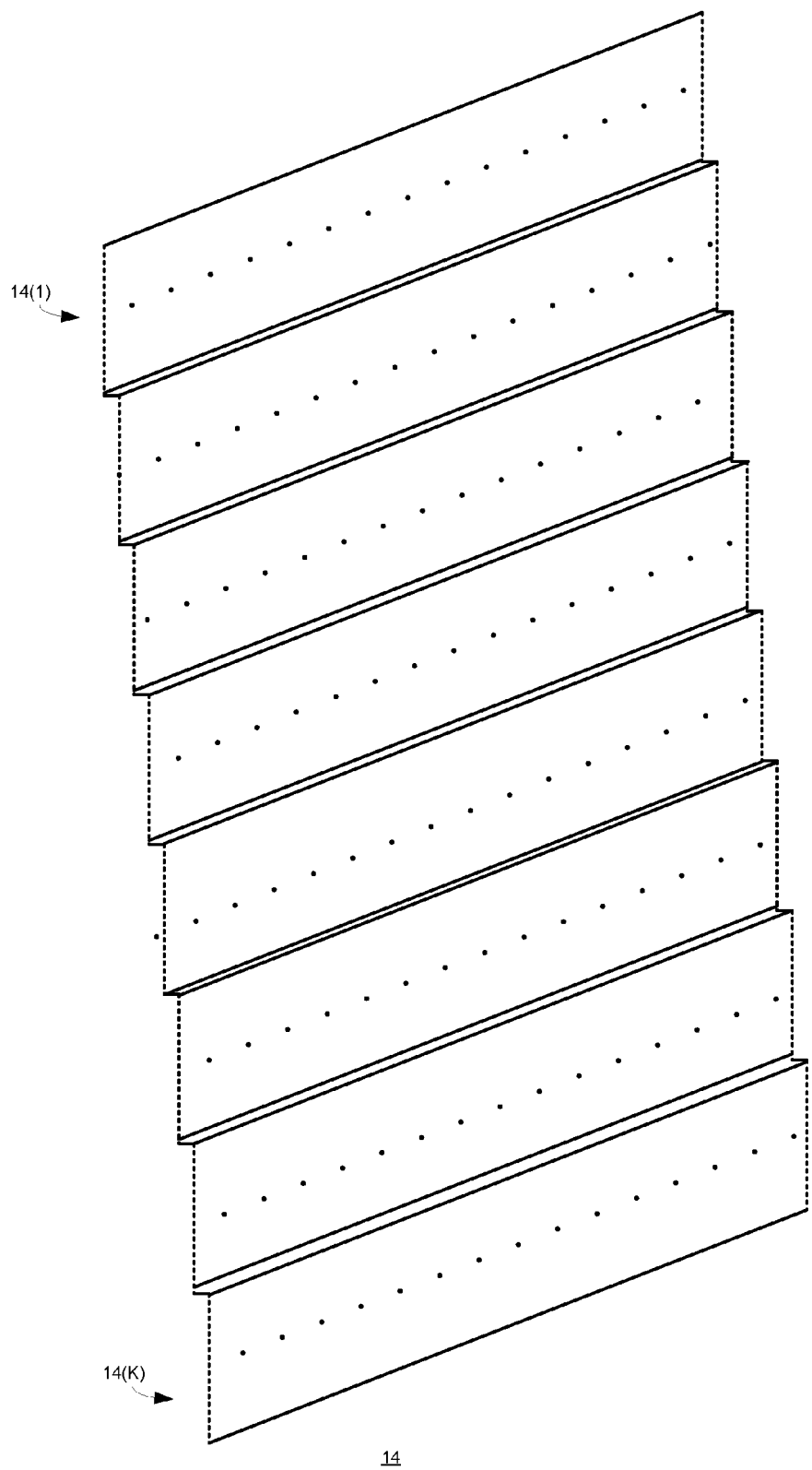

The first array of pinholes 14 is shown in FIGS. 1A and 1B as having a staircase structure in which each row of pinholes (out of rows 14(1)-14(K)) corresponds to a different focal point.

It is noted that the first array of pinholes (also referred to multiple pinholes) 14 can be of different structure and size.

For example, the first array of pinholes 14 may have a circular shape and may include rings that are located at different heights. The cross section of the first array of pinholes can be linear or non-linear.

It is noted that the number of pinhole per height (per focal plane) can differ from height to the other, that pinholes of different height can be arranged in sub-arrays that may differ from each other by shape and/or size, and the like.

Pinholes that are located at the same plane (and provide information from the same focal plane) can be regarded as a group of pinholes. Yet other examples of an array of pinholes can include a plate that is not normal to the optical path of beamlets that pass through its pinholes.

FIG. 1 also illustrates two beamlets 8(1) and 8(K) that pass through different paths and provide information about different focal planes:
  i. Beamlet 8(1) passes through a rightmost row of second array of pinholes 11, impinges onto object 13, is being reflected towards beam splitter 12, directed towards row 14(1) of first array pinholes 14 and impinges on the bottom portion of sensor 15.
  ii. Beamlet 8(K) passes through a leftmost row of second array of pinholes 11, impinges onto object 13, is being reflected towards beam splitter 12, directed towards row 14(K) of first array pinholes 14 and impinges on the top portion of sensor 15.

Figure 7:
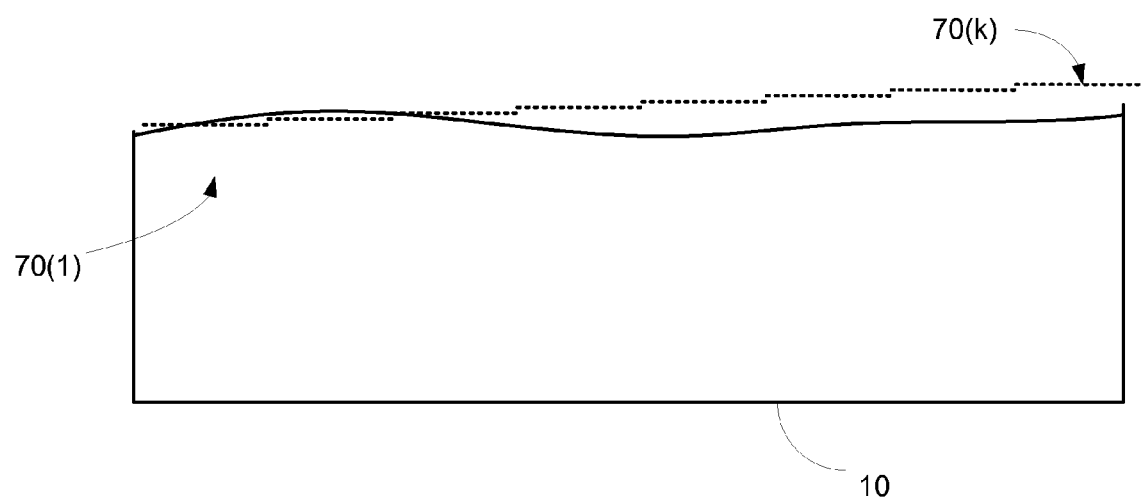
FIG. 7 is a cross sectional view of an object and of different focal planes that correspond to different rows of pinholes of the first array of pinholes, according to an embodiment of the invention.

FIG. 7 is a cross sectional view of object 10 and different focal planes 70(1)-70(K) that correspond to the different rows 14(1)-14(K) of pinholes of the first array of pinholes 14, according to an embodiment of the invention.

By scanning the object, different locations of the object can reflect (at different points of time) light towards each one of portions 14(1)-14(K) thereby providing 3D information about various locations of the object.

It is noted that a confocal microscope can acquire images while the inspected object is moved along the Z axis (with or without XY movement). This may involve using pulsed light but this is not necessarily so.

By scanning the article 13 with the first array of pinholes 14—while illuminating the article by pulses of light information about points of the article of different heights can be obtained.

It is noted that the sensor can have one or more shutters that open the sensor 15 for brief periods and that these shutters can be located elsewhere in the illumination optics (for example—such shutters can precede or follow the pinholes of the first array of pinholes 14). In this case there may be no requirement for short light pulses.

Such shutters (or shutter) can be included in addition to the pulsating light source or can be included in a system that has a continuous light source and such shutters.

FIG. 7 is a cross sectional view of a portion of an object 10 and different focal planes that correspond to the different pinholes of the first array of pinholes 14 according to an embodiment of the invention.

Figure 4:
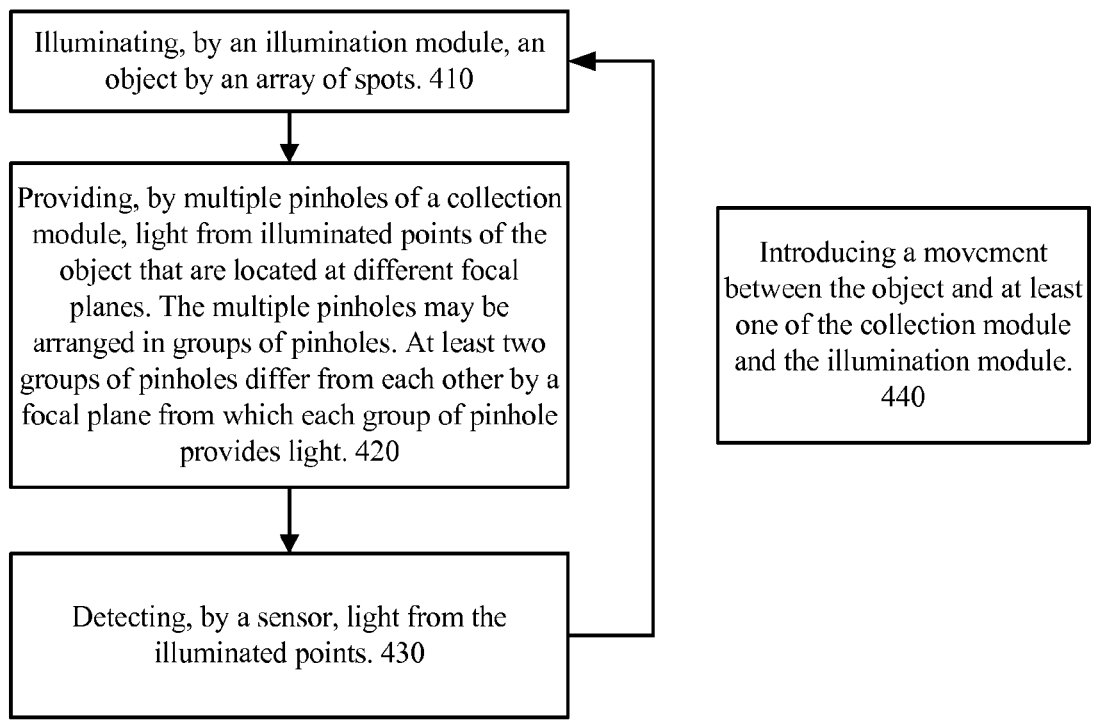
FIGS. 4-6 illustrate methods according to various embodiments of the invention.

FIG. 4 illustrates method 400 according to an embodiment of the invention.

Method 400 can be executed by system 10.

Method 400 can include stage 410 of illuminating, by an illumination module, an object by an array of spots.

Stage 410 may be followed by stage 420 of providing, by multiple pinholes of a collection module, light from illuminated points of the object that are located at different focal planes.

The multiple pinholes may be arranged in groups of pinholes. At least two groups of pinholes differ from each other by a focal plane from which each group of pinhole provides light.

Stage 420 may be followed by stage 430 of detecting, by a sensor, light from the illuminated points.

A single repetition of stages 410-430 provides information about an array of spots located at different heights.

If the object (or a portion of the object) should be scanned then multiple iterations of stage 410-430 should be provided while there is a change in the relative location of the object and the system. This is illustrated by stage 440 of introducing a movement between the object and at least one of the collection module and the illumination module. Stage 440 is shown as being parallel to stage 410-430, while stage 430 is followed by stage 410. Alternatively, the method 400 can include introducing a movement after a completion of stage 430. The movement can be continuous and using strobe illumination can reduce and even eliminate image blurs.

Stage 410 may include directing, by a beam splitter, light from the illumination module array of pinholes towards the object. Stage 420 may include directing, by the beam splitter, light from the illuminated spots of the object towards the multiple pinholes.

Stage 420 may be followed by image processing, frame grabbing and the like.

ANOTHER EMBODIMENT

Figure 2:
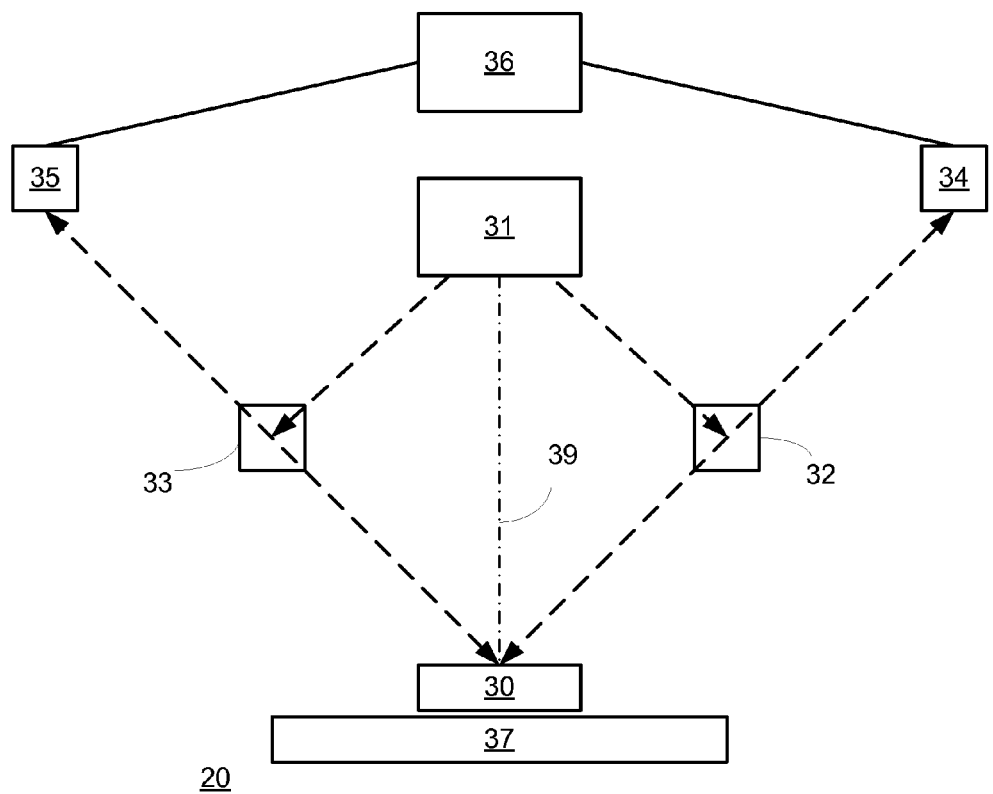
FIGS. 2-3 illustrate systems according to various embodiments of the invention.

FIG. 2 illustrates system 20 according to an embodiment of the invention.

System 20 includes a mechanical stage 37 that supports article 30. System 20 includes pulsed illumination source 31, two beam splitters 32 and 33, two sensors 34 and 35, and image processor 36.

Pulsed light source sends pulsed light beams towards beam splitters 32 and 33 along optical axes that are not normal to the surface of the object 30. In FIG. 2 these optical axes are oriented at angles of 45 and 315 degrees in relation to the object 30. Beam splitters 32 and 33 direct these pulsed lights beams towards object 30. Light reflected from the object 30 is directed through beam splitters 32 and 33 towards cameras 34 and 35. Detection signals from sensors 34 and 35 are processed by image processor 36.

Figure 5:
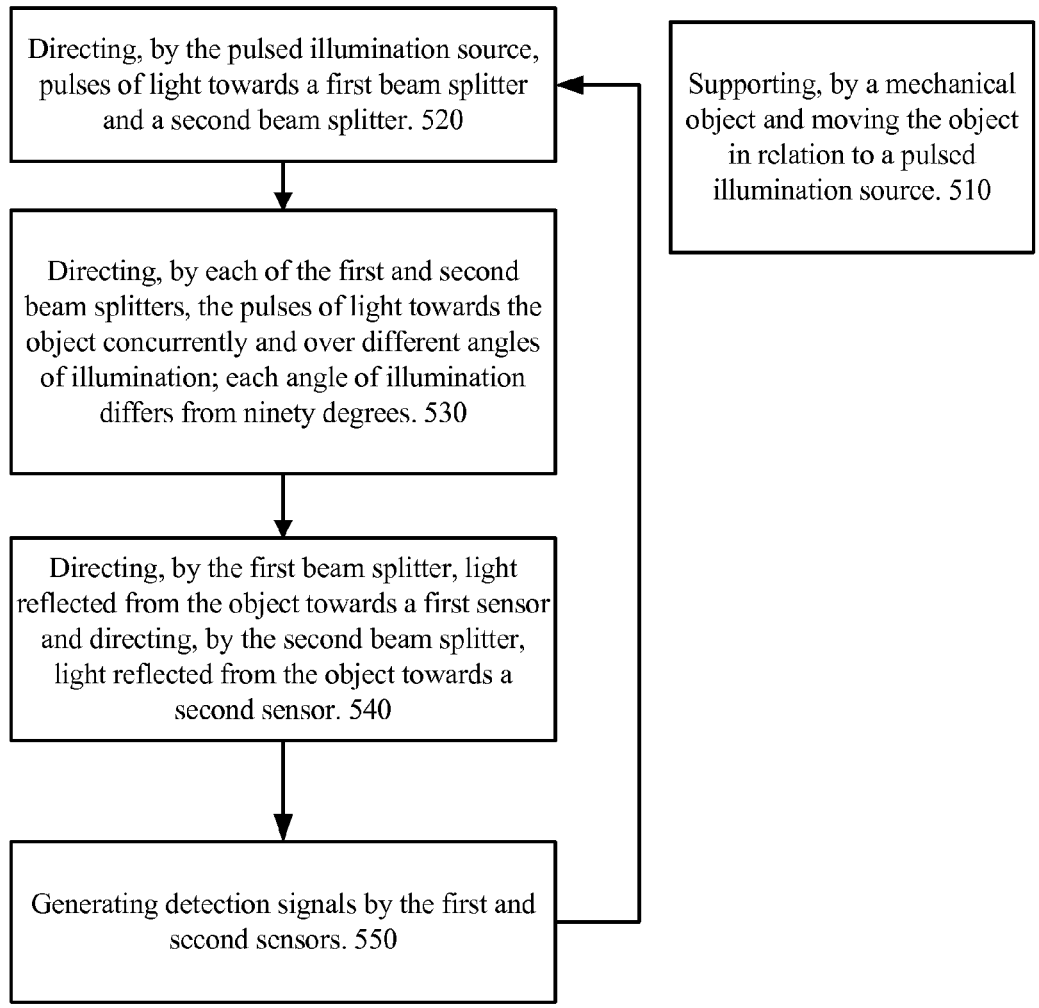

FIG. 5 illustrates method 500 according to an embodiment of the invention.

Method 500 may start by stage 510 and 520.

Stage 510 may include supporting, by a mechanical stage object and moving the object in relation to a pulsed illumination source.

Stage 520 may include directing, by the pulsed illumination source, pulses of light towards a first beam splitter and a second beam splitter.

Stage 520 may be followed by stage 530 of directing, by each of the first and second beam splitters, the pulses of light towards the object concurrently and over different angles of illumination; each angle of illumination differs from ninety degrees.

Stage 530 may be followed by stage 540 of directing, by the first beam splitter, light reflected from the object towards a first sensor and directing, by the second beam splitter, light reflected from the object towards a second sensor.

Stage 540 may be followed by stage 550 of generating detection signals by the first and second sensors.

The first and second beam splitters may be positioned in a symmetrical manner along an imaginary axis (denoted 39 in FIG. 2) between the pulsed illumination source and the object. The first and second sensors may be positioned in a symmetrical manner along the imaginary axis 39.

A length of (a) a first path defined by the pulsed illumination source, the first beam splitter, the object and the first sensor equals a length of (b) a second path defined by the pulsed illumination source, the second beam splitter, the object and the second sensor.

The first and second beam splitters may illuminate the object at illumination angles of 45 and 315 degrees.

A FURTHER EMBODIMENT

Figure 3:
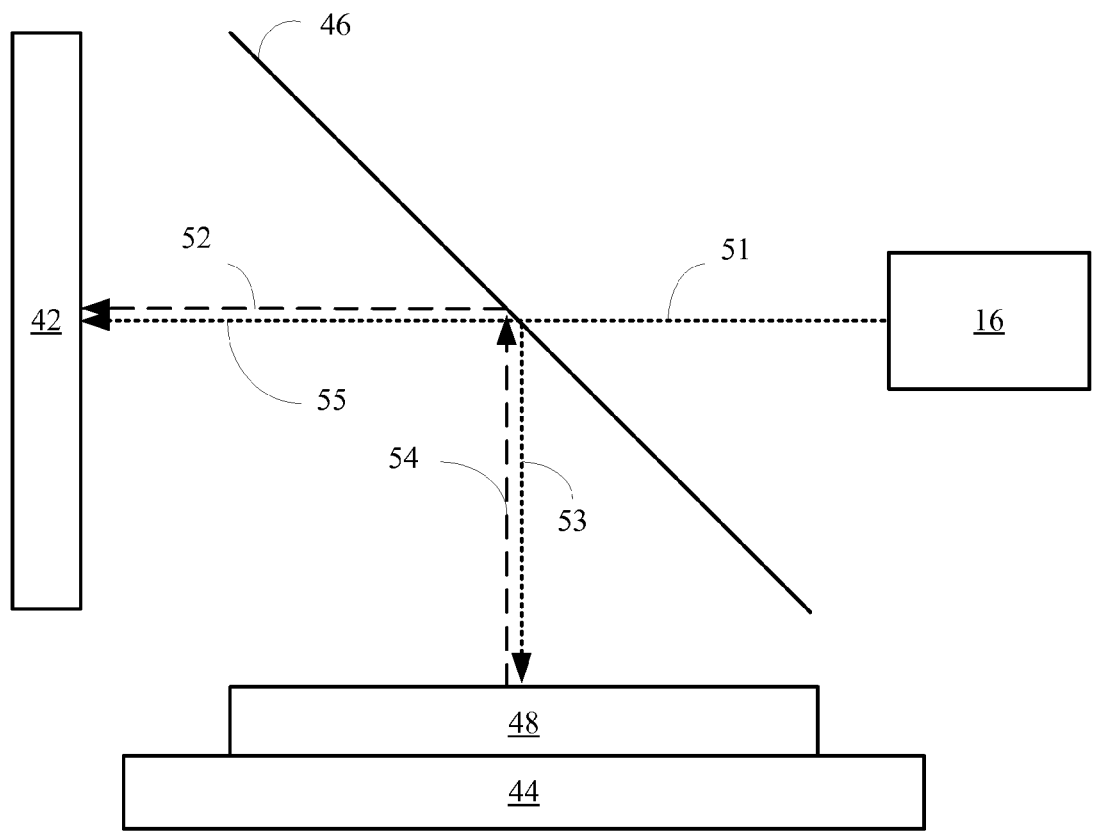
Figure 3:
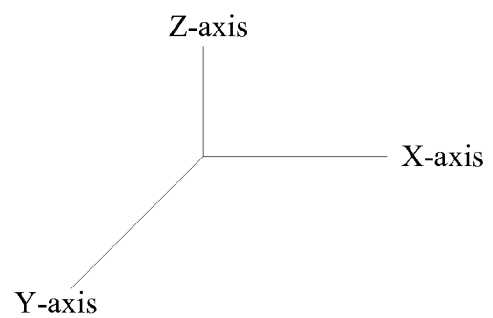

It is further noted that the method and system can be applied mutatis mutandis to 2D interferometry, a system that includes one or more lasers (in case of multiple lasers a holographic method can be applied). The system 30 can include a stage 44 that moves the inspected object 48 along X axis, Y axis and Z axis, a beam splitter 46 and a sensor 42, as illustrated in FIG. 3.

A beam of light 51 from a light source 306 is split by beam splitter 46 so that one beamlet 52 is directed to sensor 42 and one beamlet 53 is directed towards object 48. Light 54 from the object 48 is directed by beam splitter 46 to form beam 55 that is also directed towards sensor 42.

Figure 6:
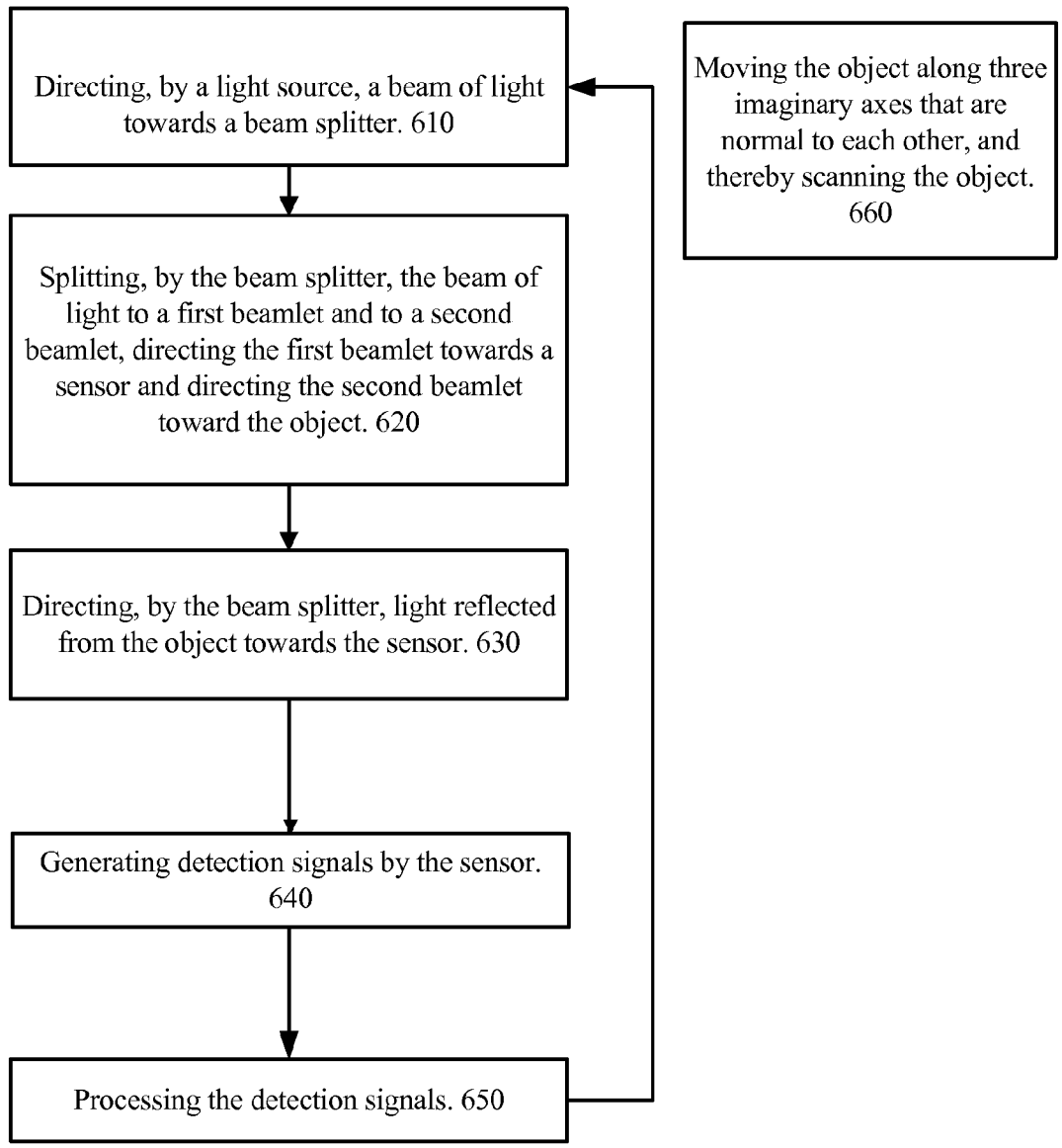

FIG. 6 illustrates method 600 according to an embodiment of the invention.

System 600 may include stage 610 of directing, by a light source, a beam of light towards a beam splitter.

Stage 610 may be followed by stage 620 of splitting, by the beam splitter, the beam of light to a first beamlet and to a second beamlet, directing the first beamlet towards a sensor and directing the second beamlet toward the object.

Stage 620 may be followed by stage 630 of directing, by the beam splitter, light reflected from the object towards the sensor.

Stage 630 may be followed by stage 640 of generating detection signals by the sensor.

Stage 640 may be followed by stage 650 of processing the detection signals. This may include reconstructing images of the object, defect detection, tomography and the like.

The method may include stage 660 of moving the object along three imaginary axes that are normal to each other, and thereby scanning the object. Stage 660 can follow the previously mentioned stages of method 600 or can be executed in parallel to one of more of these stages.

Figure 8:
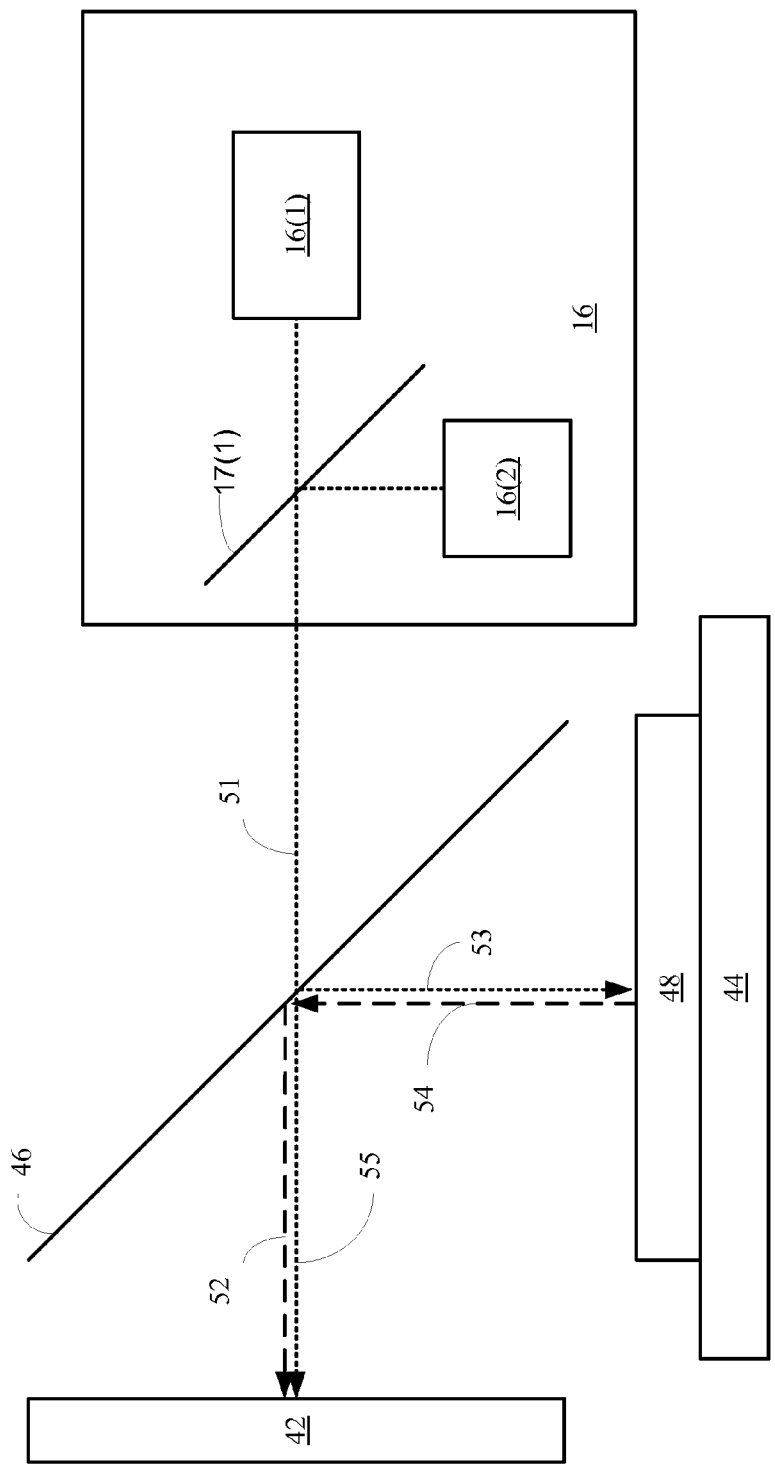
FIG. 8 illustrate system according to another embodiment of the invention.

It is noted that the light source 16 of FIG. 3 can emit light at one or more wavelengths. For example it may include multiple monochromatic light sources that may pulsate simultaneously and also may include optics (for example— beam splitter) for combining the different light pulses from the different monochromatic light sources. FIG. 8 illustrates such a system 80 in which light source 16 includes multiple light sources 16(1) and 16(2), each transmitting light pulses of different spectrum. These light pulses are combined by beam splitter 17(1) that directs these pulsed light beams towards the (primary) beam splitter 46.

It is noted that many light sources can be provided that may be arranged to direct light pulses of different spectrums (monochromatic, narrowband, non-monochromatic) and the like.

According to an embodiment of the invention any of the mentioned above systems can have a light source and a sensor (that senses the light from said light source and the light reflected from the object surface) wherein the light sensed by the sensor and the light emitted by the light source differ from each other by at least one of phase, amplitude, polarity or any other optical characteristic.

In any of the above systems that include more that a single light source then light pulses from different light sources may differ from each other at least one of phase, amplitude, polarity or any other optical characteristic.

In any of the above systems the direct light pulses (directed towards the object) and reflected light pulses may differ from each other at least one of phase, amplitude, polarity or any other optical characteristic.

In any of the above systems the collection module may be arranged to collect (a) light from the object and (b) light from the illumination module, wherein the light (collected by the collection module) from object differs from the light (collected by the collection module) from the illumination module by at least one optical characteristic such as phase, amplitude, polarity or any other optical characteristic.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A system for strobe based three dimensional imaging, the system comprises: an illumination module arranged to illuminate an object by short pulses of light that form at least one spot on the object; a collection module that comprises a sensor that is arranged to generate detection signals representative of three dimensional information about the object: and a mechanical stage that is arranged to introduce a movement between the object and at least one of the collection module and the illumination module;
    wherein the illumination module is arranged to illuminate an object by an array of spots; wherein the collection module comprises multiple pinholes that are arranged to provide light from illuminated points of the object that are located at different focal planes and a sensor arranged to detect the light from the multiple pinholes;
    wherein the multiple pinholes are arranged in groups of pinholes; and wherein the multiple pinholes comply with at least one of the following criteria:
        at least two groups of pinholes differ from each other by a focal plane from which each group of pinhole provides light;
        pinholes that belong to a same group of pinholes provide light from a same focal plane;
    and wherein different groups of pinholes provide light from different focal planes;
        different groups of pinholes are located at different distances from the sensor; and
        different groups of pinholes are located at different distances from the object.

2. The system according to claim 1, wherein at least two groups of pinholes differ from each other by the focal plane from which each group of pinhole provides light.

3. The system according to claim 1, wherein pinholes that belong to the same group of pinholes provide light from the same focal plane; and wherein different groups of pinholes provide light from different focal planes.

4. The system according to claim 3, wherein the multiple pinholes form a staggered array of pinholes.

5. The system according to claim 1, wherein different groups of pinholes are located at different distances from the sensor.

6. The system according to claim 1, wherein different groups of pinholes are located at different distances from the object.

7. The system according to claim 1, wherein the illumination module comprises a pulsating light source.

8. A system for strobe based three dimensional imaging, the system comprises: an illumination module arranged to illuminate an object by short pulses of light that form at least one spot on the object; a collection module that comprises a sensor that is arranged to generate detection signals representative of three dimensional information about the object: and a mechanical stage that is arranged to introduce a movement between the object and at least one of the collection module and the illumination module;
    wherein the illumination module comprises a pulsed illumination source; wherein the illumination module and the collection module share a first beam splitter; wherein the collection module further comprises a first sensor; wherein the pulsed illumination source is arranged to direct pulses of light towards the first beam splitter; wherein the first beam splitter is arranged to direct the pulses of light towards the object at an angle of illumination that differs from ninety degrees; wherein the first beam splitter is arranged to direct light reflected from the object towards the first sensor;
    wherein the illumination module and the collection module also share a second beam splitter; wherein the collection module further comprises a second sensor;
    wherein the pulsed illumination source is arranged to direct pulses of light towards the first beam splitter and the second beam splitter; wherein each of the first and second beam splitters is arranged to direct the pulses of light towards the object concurrently and over different angles of illumination; wherein each angle of illumination differs from ninety degrees; wherein the first beam splitter is arranged to direct light reflected from the object towards the first sensor; and wherein the second beam splitter is arranged to direct light reflected from the object towards the second sensor.

9. The system according to claim 8, wherein the first and second beam splitters are positioned in a symmetrical manner along an imaginary axis between the pulsed illumination source and the object; wherein the first and second sensors are positioned in a symmetrical manner along the imaginary axis.

10. The system according to claim 8, wherein a length of (a) a first path defined by the pulsed illumination source, the first beam splitter, the object and the first sensor equals a length of (b) a second path defined by the pulsed illumination source, the second beam splitter, the object and the second sensor.

11. The system according to claim 8, wherein the first and second beam splitters illuminate the object at illumination angles of 45 and 315 degrees.

12. A method comprising:
    illuminating, by an illumination module, an object by short pulses of light that form at least one spot on the object;
    generating, by a sensor of a collection module, detection signals representative of three dimensional information about the object: and
    introducing, by a mechanical stage, a movement between the object and at least one of the collection module and the illumination module;
    wherein the illumination module is arranged to illuminate an object by an array of spots; wherein the collection module comprises multiple pinholes that are arranged to provide light from illuminated points of the object that are located at different focal planes and a sensor arranged to detect the light from the multiple pinholes;
    wherein the multiple pinholes are arranged in groups of pinholes; and wherein the multiple pinholes comply with at least one of the following criteria: (a) at least two groups of pinholes differ from each other by a focal plane from which each group of pinhole provides light; (b) pinholes that belong to a same group of pinholes provide light from a same focal plane; and wherein different groups of pinholes provide light from different focal planes; (c) different groups of pinholes are located at different distances from the sensor; and (d) different groups of pinholes are located at different distances from the object.

13. The method according to claim 12, wherein at least two groups of pinholes differ from each other by the focal plane from which each group of pinhole provides light.

14. The method according to claim 12, wherein pinholes that belong to the same group of pinholes provide light from the same focal plane; and wherein different groups of pinholes provide light from different focal planes.

15. The method according to claim 12, wherein the multiple pinholes form a staggered array of pinholes.

16. The method according to claim 12, wherein different groups of pinholes are located at different distances from the sensor.

17. The method according to claim 12, wherein different groups of pinholes are located at different distances from the object.

18. The method according to claim 12, wherein the illumination module comprises a pulsating light source.

* * * * *